(12) United States Patent
Carr et al.

(10) Patent No.: US 8,259,110 B1
(45) Date of Patent: Sep. 4, 2012

(54) METHOD AND APPARATUS FOR COMPUTING DIRECT LIGHTING FOR GLOBAL ILLUMINATION RENDERING IN 3-D COMPUTER GRAPHICS

(75) Inventors: Nathan A. Carr, Santa Clara, CA (US); Aravind Krishnaswamy, San Jose, CA (US); Jared M. Johnson, San Jose, CA (US); Gavin S. P. Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1112 days.

(21) Appl. No.: 12/142,176

(22) Filed: Jun. 19, 2008

Related U.S. Application Data

(60) Provisional application No. 60/987,348, filed on Nov. 12, 2007.

(51) Int. Cl.
*G06T 15/50* (2011.01)
*G06T 15/60* (2006.01)
(52) U.S. Cl. ...................................... 345/426
(58) Field of Classification Search ........................ None
See application file for complete search history.

(56) References Cited

OTHER PUBLICATIONS

S.Laine et al.; Soft Shadow Volumes for Ray Tracing, ACM Transactions on Graphics 24 (Proc. SIGGRAPH), Jul. 2005.*
Bauer; The Direct Illuminace Cache; http://web.archive.org/web/20021008120751/http://www.radiance-online.org/radiance-workshop1/cd/Bauer/dcman.html; retrieved by the Internet Archive on Oct. 8, 2002.*
Fernandez; Interactive Direct Illumination in Complex Environments; Cornell University; 2004.*
Smyk M., Myszkowski K.: "Quality Improvement for Indirect Illumination Interpolation," In ICCVG (2002), Zakopane, Sep. 25-29, 2002,8 pages.
William A. Stokes , James A. Ferwerda , Bruce Walter , Donald P. Greenberg: "Perceptual Illumination Components: A New Approach to Efficient, High Quality Global Illumination Rendering," ACM Transactions on Graphics (TOG), v.23 n. 3, Aug. 2004, 8 pages.
Don P. Mitchell, "Generating Antialiased Images at Low Sampling Densities," AT&T Bell Laboratories, Computer Graphics, vol. 21, No. 4, ACM, Jul. 1987, 8 pages.
Mahesh Ramasubramanian, et al., "A Perceptually Based Physical Error Metric for Realistic Image Synthesis,"Program of Computer Graphics/Cornell University, SIGGRAPH 99, Los Angeles, CA, ACM 1999, pp. 73-82.
Mark R. Bolin, et al., "A Perceptually Based Adaptive Sampling Algorithm," Dept. of Computer and Information Science/University of Oregon, 1998, 11 pages.
Halton, J. H. 1960. On the efficiency of certain quasi-random sequences of points in evaluating multi-dimensional integrals. Numerische Mathematik, 2(1):84-90.

(Continued)

*Primary Examiner* — Kee M Tung
*Assistant Examiner* — Carlos Perromat
(74) *Attorney, Agent, or Firm* — Robert C. Kowert; Meyertons, Hood, Kivlin, Kowert & Goetzel, P.C.

(57) ABSTRACT

A method and apparatus for computing direct lighting in a scene is described. For a sparse set of points in the scene, occlusion information for the points and each of one or more light sources may be computed and stored. For all other surface points in the scene, nearby sample points are examined to determine if their occlusion information agrees. For any light source for which nearby sample points do not agree, lighting computation may be performed, e.g. by the casting of shadow rays. Such areas comprise regions in penumbra or shadow boundaries. For all other regions, it is assumed that they are fully lit or fully occluded, and thus the casting of shadow rays can be avoided.

24 Claims, 15 Drawing Sheets

OTHER PUBLICATIONS

Jensen, H. W. and Christensen, N. J. 1995. Optimizing path tracing using noise reduction filters. In Proceedings of WSCG 1995, pp. 134-142.

Keller, A. and Heidrich, W. 2001. Interleaved sampling. In Proceedings of the 12th Eurographics Workshop on Rendering Techniques, London, UK. Springer-Verlag, pp. 269-276. ISBN 3-211-83709-4.

Kontkanen, J., Rasanen, J., and Keller, A. 2004. Irradiance filtering for monte carlo ray tracing. In Monte Carlo and Quasi-Monte Carlo Methods 2004, Springer, pp. 259-272.

Kopf, J., Cohen, M., Lischinski, D., and Uyttendaele, M. 2007. Joint bilateral upsampling. ACM Transactions on Graphics (Proceedings of SIGGRAPH 2007), 26(3):96.

Lindemann, S. and Lavalle, S. 2003. Incremental low discrepancy lattice methods for motion planning. In Robotics and Automation, 2003. Proceedings. ICRA '03. IEEE International Conference on, vol. 3, pp. 2920-2927 vol. 3.

McCool, M. D. 1999. Anisotropic diffusion for monte carlo noise reduction. ACM Trans. Graph., 18(2):171-194. ISSN 0730-0301.

Segovia, B., Iehl, J.-C., Mitanchey, R., and P'Eroche, B. 2006. Non-interleaved deferred shading of interleaved sample patterns. In Proceedings of Graphics Hardware, pp. 53-60.

I.M. Sobol, "On quasi-Monte Carlo integrations," Mathematics and Computers in Simulation 47 (1998) pp. 103-112, Institute for Mathematical Modelling of the Russian Academy of Sciences, 4 Miusskaya Square, Moscow 125047, Russia.

Wald, I., Kollig, T., Benthin, C., Keller, A., and Slusallek, P. 2002. Interactive Global Illumination using Fast Ray Tracing. In Proceedings of the 13th Eurographics Workshop on Rendering, Saarland University, Kaiserslautern University.

Krivanek, J. and Gautron, P. 2009. "Practical Global Illumination With Irradiance Caching", Morgan & Claypool Publishers, 148 pages.

Bradley, P., Fox, B. L., "Implementing Sobol's quasirandom sequence generator," ACM Transactions on Mathematical Software (TOMS), vol. 14, Issue 1 (Mar. 1988), pp. 88-100, Year of Publication: 1988, ISSN:0098-3500.

Krivanek, J. and Gautron, P. "Practical Global Illumination With Irradiance Caching", SIGGRAPH 2008 Class, 405 pages.

Kajiya, J. T. 1986. The rendering equation. Proc. SIGGRAPH 86 (Aug.), 143-150.

Krivanek, J., et al., Improved radiance gradient computation. In SCCG '05: Proceedings of the 21st spring conference on Computer graphics, ACM Press, New York, NY, USA, 155-159.

Krivanek, J., et al., 2005. Radiance caching for efficient global illumination computation. IEEE Transactions on Visualization and Computer Graphics 11,5 (Sep./Oct.). Also available as Technical Report #1623, IRISA.

Krivanek, J., et al., J. 2006. Making radiance and irradiance caching practical: Adaptive caching and neighbor clamping. In Rendering Techniques 2006, Eurographics Symposium on Rendering, Eurographics Association, Nicosia, Cyprus, T. Akenine-Miler and W. Heidrich, Eds., Eurographics Association.

Velazquez-Armendariz, E., Lee, E., Bala,K., and Walter, B. 2006. Implementing the render cache and the edge-and-point image on graphics hardware. In GI'06: Proceedings of the 2006 conference on Graphics interface, Canadian Information Processing Society, Toronto, Ont., Canada, Canada, 211-217.

Ward, G. J., and Heckbert, P. 1992. Irradiance Gradients. In Third Eurographics Workshop on Rendering, 85-98.

Ward, G. J., Rubinstein, F. M., and Clear, R. D. 1988. A ray tracing solution for diffuse interreflection. In SIGGRAPH '88: Proceedings of the 15th annual conference on Computer graphics and interactive techniques, ACM Press, New York, NY, USA, 85-92.

\* cited by examiner

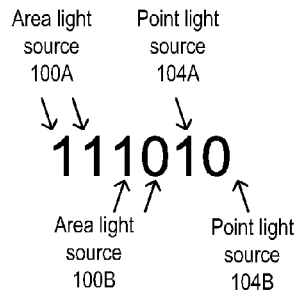

Figure 3A

Point (0,0) Point (0,1) Point (0,2) Point (0,3) Point (0,4) Point (0,5) Point (0,6) Point (0,7) ...

Point
(0,0) (0, 1) (0,2) (0,3) (0,4) (0,5) (0,6) (0,7) ...

Area light source 100A ⟶ 11/00/00/00/00/00/00/00/ ...
Area light source 100B ⟶ 10/00/00/00/00/00/00/00/ ...
Point light source 104A ⟶ 1/0/0/0/0/0/0/0/ ...
Point light source 104B ⟶ 0/0/0/0/0/0/0/0/ ...

METHOD AND APPARATUS FOR COMPUTING DIRECT LIGHTING FOR GLOBAL ILLUMINATION RENDERING IN 3-D COMPUTER GRAPHICS

PRIORITY INFORMATION

This application claims benefit of priority of U.S. Provisional Application Ser. No. 60/987,348 entitled "Method and Apparatus for Global Illumination Rendering in 3-D Computer Graphics" filed Nov. 12, 2007, the content of which is incorporated by reference herein in its entirety.

BACKGROUND

Description of the Related Art

Three-dimensional (3-D) computer graphics is concerned with digitally synthesizing and manipulating 3-D visual content. In 3-D computer graphics, global illumination rendering is a method that attempts to capture the way in which light interacts in the real world. Global illumination algorithms generally take into account the light that comes directly from a light source (direct illumination), and also light rays from the same source reflected by other surfaces in the scene (indirect illumination). The results achieved by global illumination rendering processes may produce more photo-realistic synthesized or manipulated images. Conventional global illumination rendering methods are computation-intensive and time-consuming processes, and are thus typically used for off-line rendering rather than in real-time image generation, for example in computer-generated imagery (CGI) applications. Computer-generated imagery (CGI) is the application of the field of computer graphics in various media including, but not limited to: films, television programs, commercials, simulators and simulation generally, and printed media. CGI images are typically produced "off-line"; that is, not in real-time.

Irradiance caching algorithms have been introduced that separate out the low frequency diffuse interreflection component of the rendering equation. Due to its low frequency nature, this component can be sparsely evaluated over the scene at a set of carefully chosen sample points. Interpolation can be performed to reconstruct the signal over the entire scene. This technique has been extended to other low frequency parts of the rendering equation such as glossy reflections.

Caching has been employed to accelerate rendering. For example, a Render Cache has been described that stores computed pixels in screen space and reprojects them as the view changes. Such a cache only maintains visible samples and relies on inter-frame coherence. A more broad-based scheme for storing view independent shading data in caches has also been described.

Ray tracing is a general technique from geometrical optics for modeling the paths taken by light as it interacts with optical surfaces.

An octree is a tree data structure in which each internal node has up to eight children. Octrees may be used, for example, to partition a three dimensional space by recursively subdividing it into eight octants.

SUMMARY

Various embodiments of a method and apparatus for global illumination rendering in three-dimensional (3-D) computer graphics are described. Conventional global illumination rendering methods are computation-intensive and time-consuming processes. Embodiments may provide a method and apparatus for computing direct lighting in a scene that reduces the expense of this computation or subprocess. Embodiments may be implemented as or in a direct lighting module.

In many scenes, fully lit regions and shadow regions are fairly coherent. Embodiments may exploit this property by using a form of polling. For a sparse set of points in the scene, occlusion information for the points and each of the one or more light sources may be computed. The result may be stored, for example, as a bit field with each sample point. For all other surface points in the scene, these nearby sample points are gathered and examined to see if their occlusion information agrees. For any light source for which nearby sample points do not agree, lighting computation may be performed as usual. Such areas comprise regions in penumbra. For all other regions, it is assumed that they are fully lit or fully occluded, thus the casting of expensive shadow rays can be avoided. The approach may encounter problems in a scene when a very thin structure in the scene casts shadows. The sparse sample spacing can be controlled to improve quality for such a scene.

One embodiment may store occlusion information in world space at equally spaced cache points in a "lazy" manner. "Lazy" means that a cache point is calculated only when it is needed. In one embodiment, the occlusion information may be calculated by casting shadow rays. In one embodiment, a single bit may be used to store occlusion information for each point light in the scene, and two bits may be used to store occlusion information for each area light in the scene. In one embodiment that uses two bits to store occlusion information, a first value of the two bits may indicate full occlusion, or umbra, and a second value may indicate full visibility or light. In one embodiment, a third value for the two bits may indicate partial occlusion, or penumbra. In one embodiment, if there are few area lights in a scene, or if they dominate the lighting, a collection of two-bit pairs for sub-domains of each area light may be stored. In other embodiments, more than two bits may be used to store occlusion information for each cache point.

BRIEF DESCRIPTION OF THE DRAWINGS

FIGS. 3A through 3C illustrate exemplary data structure methods for the caching of occlusion information according to some embodiments.

FIGS. 4A through 4C illustrate the use of an exemplary occlusion information cache in computing direct lighting according to one embodiment.

Figure 1:
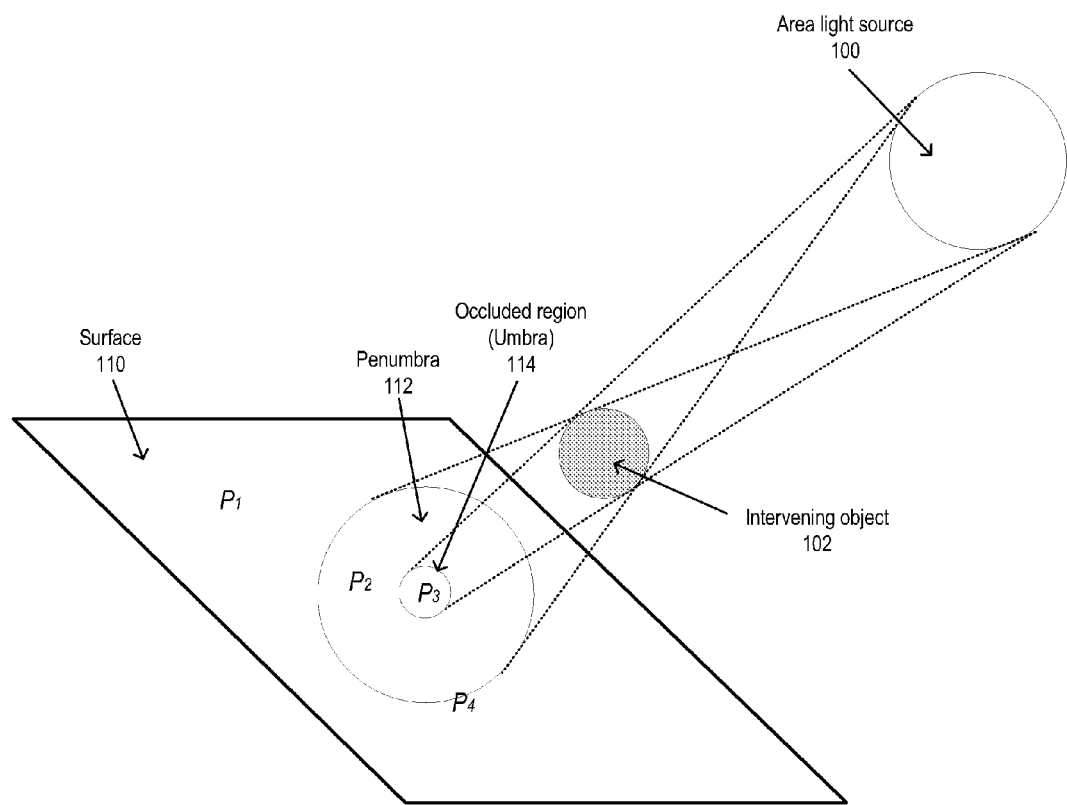
FIG. 1 illustrates a scene with an area light source, a surface, and an intervening object.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for global illumination rendering in three-dimensional (3-D) computer graphics are described. Conventional global illumination rendering methods are computation-intensive and time-consuming processes. Two computation-intense and thus time-consuming subprocesses of global illumination rendering are the computation of direct lighting from area light sources and the computation of indirect lighting that reaches a surface via multiple bounces. Embodiments may provide a method for computing direct lighting in 3-D computer graphics images (also referred to herein as "scenes") that reduces the expense of this computation or subprocess. Embodiments may also provide a method for diffuse indirect lighting computation that reduces the expense of this computation or subprocess. In various embodiments, the two methods may be implemented alone (e.g., as separate modules) or in combination (e.g., as components of a global illumination rendering module), and may alone or in combination reduce the time it takes to perform global illumination rendering of a scene. Examples of types of applications in which embodiments may be implemented may include, but are not limited to, scientific, medical, design (e.g., CAD systems), painting, publishing, digital photography, video editing, games, animation, and/or other applications in which digital image generation, rendering and/or processing may be performed. Specific examples of applications in which embodiments may be implemented include, but are not limited to, Adobe® Photoshop® and Adobe® Illustrator®.

Direct Lighting Computation

Embodiments may provide a method and apparatus for computing direct lighting in a scene. An implementation of the method for computing direct lighting in a scene may be referred to herein as a direct lighting module. Examples of types of applications in which embodiments of a direct lighting module may be implemented may include, but are not limited to, scientific, medical, design (e.g., CAD systems), painting, publishing, digital photography, video editing, games, animation, and/or other applications in which digital image generation and/or processing may be performed. Specific examples of applications in which embodiments may be implemented include, but are not limited to, Adobe® Photoshop® and Adobe® Illustrator®.

When a scene contains numerous point light sources or area light sources, or even a single area light source, using conventional systems, a large number of shadow rays are needed to determine the light that reaches each surface point in a scene. The performance of rendering goes down quite a bit when large area light sources (tube light, square light in ceiling, etc.) are used instead of a point light source, or when many point or area light sources are used. The reason is that, typically from a point in space, it is necessary to determine how much of that area light source is occluded by other geometry, and how much of the light source is visible. For some points in a scene, the light source will be occluded. For others, the light source will be fully unoccluded. For the remaining points, the expensive ones to calculate, the points are in the penumbra; parts of the area light source are visible, and other parts are not visible, from that point in space. The penumbra areas tend to, or should in a graphic image, have a smooth gradient look. The "brute force" way to calculate occlusion information at a point using ray tracing is to take a point of interest, choose a random point on the light source, and perform a ray query test to see if that ray segment is occluded by some intermediate geometry, then choose another point on the light source and do it again, and so on. Each time a ray segment that is not occluded is found, the light contribution for that point on the light is added for the point in space. This is extremely expensive, as many (e.g., hundreds) of rays may need to be fired from each point being tested. Large area light sources or many point or area light sources in a scene are thus computationally expensive when calculating light at points in the scene.

In many scenes, fully lit regions and shadow regions are fairly coherent. Embodiments of a direct lighting module as described herein may exploit this property by using a form of polling. For a sparse set of points in the scene, occlusion information for the points and each of the one or more light sources may be computed, e.g. using the "brute force" method of ray tracing. The results may be stored or cached in a data structure, for example, as a bit field with each sample point, or in an octree data structure. For all other surface points in the scene, nearby ones of these sample points are gathered and examined to see if their occlusion information agrees. For any light source for which nearby sample points do not agree, the lighting computation may be performed as usual, e.g. using ray tracing. Such areas comprise regions in penumbra or shadow boundaries. For all other regions, it is assumed that they are fully lit or fully occluded, thus the casting of expensive shadow rays can be avoided. The approach may fail in a scene when a very thin structure in the scene cast shadows. The sparse sample spacing can be controlled to improve quality for such a scene. When generating the occlusion cache, in addition to firing rays from the 3D cache points, additional 3D locations may be used, such as would arise from a higher-resolution rendering of the scene. These points may query their local cache points. When these cache points agree that a given point should be all lit or all in shadow, additional rays may be fired from the additional 3D locations, towards the light source to validate the cache. Where these rays have occlusion outcomes that disagree with the local cache points, those cache points may be marked as partially occluded. A subsequent rendering of an image using the cache points will then be much less likely to fail when a very thin structure is present in the cast shadows. These "validation" rays may be far less numerous than would be required for brute-force global illumination, and so a more accurate image may be computed at considerably less computational cost than brute-force rendering.

FIG. 1 illustrates a scene with an area light source 100, a surface 110, and an intervening object 102 according to one embodiment. The intervening object 102 produces an occluded region (umbra) 114 and a partially occluded region (penumbra) 112 on surface 110. The rest of surface 110 is fully illuminated by area light source 100. In embodiments, occlusion information for a sparse set of points on surface 110 and area light source 100 may be computed using shadow rays (ray tracing). This occlusion information may be stored in a data structure for each of the sparse set of points, and may indicate if the sample points are fully occluded, fully illuminated, or partially occluded. For all of the other points on surface 110, for each of the points, at least some of the sparse set of points that are nearby or in a neighborhood (e.g., a circular region) with the point may be polled or checked to determine, to a specified degree of confidence, if the point being tested is fully occluded or fully illuminated. If the point is determined to be fully occluded or fully illuminated by polling points within the neighborhood of the point, lighting computation using shadow rays does not have to be performed for the point; instead, the lighting information can simply be obtained from a neighboring point or points. In one embodiment, the point may be indicated as being fully occluded or fully lit in the data structure and thus may be polled at other nearby points. If the point is not determined to be fully occluded or fully illuminated via polling of neighborhood points, the point is assumed to be in or near penumbra 112 and lighting computation and occlusion information for the point and area light source 100 may be computed by "brute force"; in other words by using shadow rays.

In FIG. 1, for example, polling of points within the neighborhood of $P_1$ may determine that $P_1$ is fully illuminated by light source 100; therefore, lighting computation may not be performed for $P_1$. Polling of points within the neighborhood of $P_3$ may determine that $P_3$ is fully occluded by intervening object 102; therefore, lighting computation may not be performed for $P_3$. Polling of points within the neighborhoods of $P_2$ and $P_4$, however, may not determine full occlusion or full illumination, and therefore, the points may be assumed to be within (or near) penumbra 112, and thus shadow rays may be used to perform lighting computation for these points.

Figure 2:
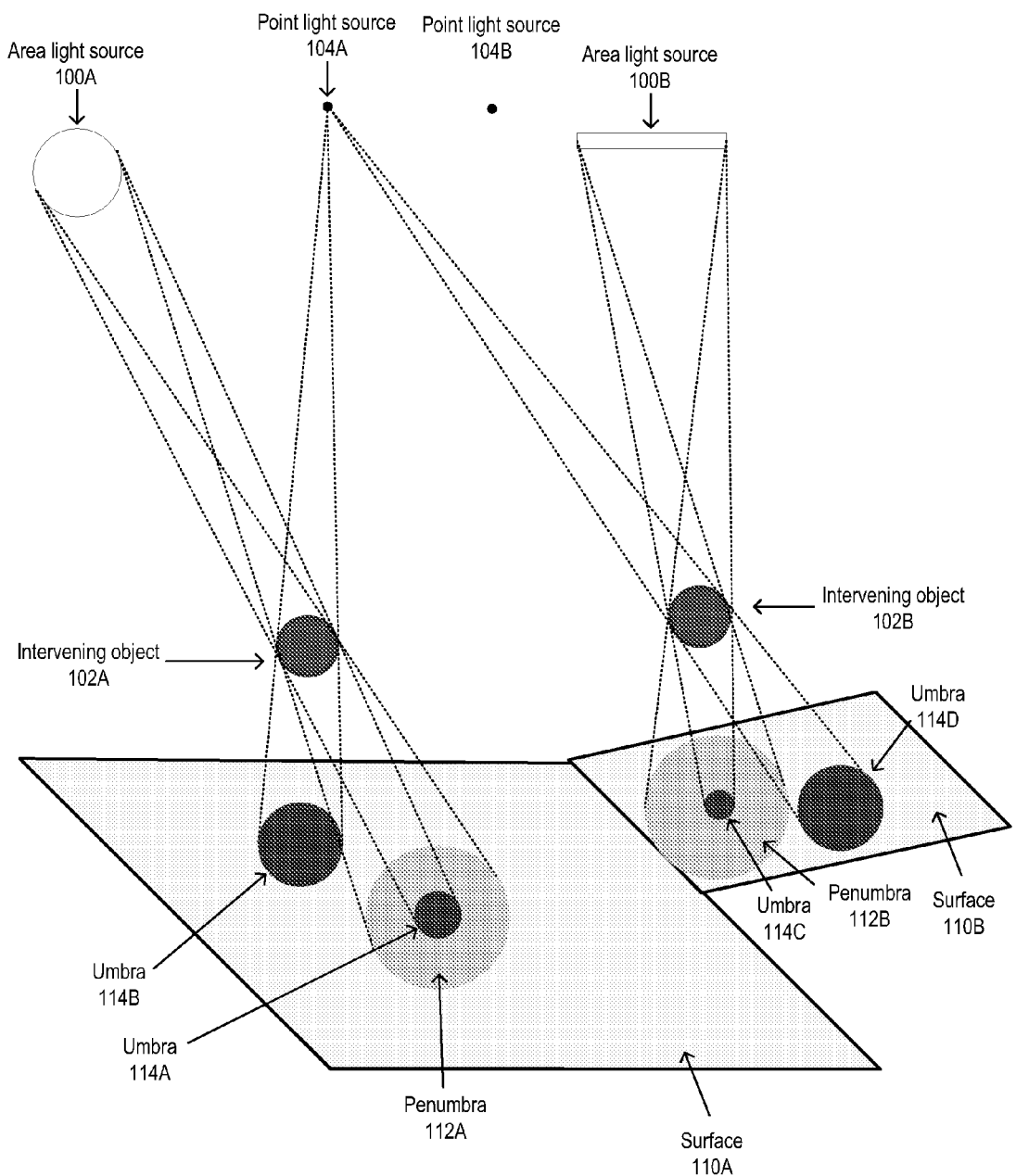
FIG. 2 illustrates an exemplary scene with multiple light sources, multiple surfaces, and multiple intervening objects according to one embodiment.

The above may be performed for all surfaces and for all light sources within a 3-D graphic image. FIG. 2 illustrates an exemplary scene with multiple light sources, multiple surfaces, and multiple intervening objects according to one embodiment. This Figure shows two area light sources 100A and 100B and two point light sources 104A and 104B. There are two intervening objects 102A and 102B, and two surfaces 110A and 110B. Intervening object 102A produces an umbra 114A and a penumbra 112A on surface 110A corresponding to area light source 100A. The rest of surface 110A is fully illuminated by area light source 100A. Intervening object 102A produces an umbra 114B on surface 110A corresponding to point light source 104A; there is no significant associated penumbra. The rest of surface 110A is fully illuminated by point light source 104. Intervening object 102B produces an umbra 114C and a penumbra 112B on surface 110B corresponding to area light source 100B. The rest of surface 110B is fully illuminated by area light source 100B. Intervening object 102B produces an umbra 114D on surface 110B corresponding to point light source 104A; there is no significant associated penumbra. The rest of surface 110B is fully illuminated by point light source 104A.

For simplicity, illumination/occlusion for point light source 104B is not shown in FIG. 2 (i.e., both surfaces 110 are assumed fully illuminated by point light source 104B). Also, surface 110A is shown to be fully illuminated by area light source 100B, and surface 110B is shown to be fully illuminated by area light source 100A. However, point light source 104B may be occluded on one or both surfaces 110 by intervening objects 102, area light source 110A may be occluded on surface 110B by intervening object 102B, and area light source 110B may be occluded on surface 110A by intervening object 102A.

In the example shown in FIG. 2, occlusion information for a sparse set of points on each surface 110A and 110B may be calculated using shadow rays for area light sources 100A and 100B and point light sources 104A and 104B. This occlusion information for each of the sparse set of points may be stored in an occlusion data structure. The occlusion information for each of the sparse set of points may indicate if the point is fully occluded, fully illuminated, or partially occluded. For each of the other points on each surface 110A and 110B, at least some of the points, for which occlusion information has been stored to the occlusion data structure and that are nearby or in the neighborhood (e.g., within a circular region, or within a specified distance) of the point, may be polled or checked to determine, to a specified degree of confidence, if the point being tested is fully occluded or fully illuminated. If the point is determined to be fully occluded or fully illuminated by polling points within the neighborhood of the point, lighting computation using shadow rays does not have to be performed for the point; instead, the lighting information may simply be obtained from a neighboring point or points. In one embodiment, the point may be indicated as being fully occluded or fully illuminated in the occlusion data structure and thus may be polled at other nearby points in determining occlusion information for the other points. If the point is not determined to be fully occluded or fully illuminated via polling of neighborhood points, the point is assumed to be partially occluded, or in or near penumbra, and lighting computation and occlusion information for the point and the area light source 100 may be performed by using shadow rays.

One embodiment may store occlusion information to the occlusion data structure in world space at equally spaced cache points on surfaces in a "lazy" manner. "Lazy" means that a cache point is calculated only when it is needed. In one embodiment, the occlusion information for the cache points may be calculated by casting shadow rays. In one embodiment, a single bit may be used to store occlusion information for each point light source in the scene, and two bits may be used to store occlusion information for each area light source in the scene. Alternatively, two bits may be used to store occlusion information for all light sources in the scene. In other embodiments, more than two bits may be used to store occlusion information for each light source. In one embodiment that uses two bits to store occlusion information, a first value of the two bits may indicate full occlusion, or umbra (e.g., binary 01), a second value may indicate fully illuminated (e.g., binary 10), and a third value may indicate partial occlusion, or penumbra (e.g., binary 11). In one embodiment, a fourth value for the two bits may indicate that lighting information for the point has not yet been computed (e.g., binary 00). In one embodiment, if there are few area lights in a scene, or if they dominate the lighting, a collection of two-bit pairs for sub-domains of each area light may be stored.

FIGS. 3A through 3C illustrate exemplary data structure methods for the caching of occlusion information according to some embodiments. The examples in these Figures are exemplary, and are not intended to be limiting. Other data structure methods, such as an octree data structure, may be used in other embodiments.

FIG. 3A shows exemplary occlusion information for one point on a surface in the exemplary scene of FIG. 2 stored as binary data. In this example, the first two bits correspond to area light source 100A, the second two bits correspond to area light source 100B, the next bit corresponds to point light source 104A, and the last bit corresponds to point light source 104B. Assuming the binary values in the following Tables indicate the corresponding occlusion/lighting states:

TABLE 1

Area light source

| | |
|---|---|
| 00 | Not computed |
| 01 | Fully occluded (Umbra) |
| 10 | Fully illuminated |
| 11 | Partially occluded (Penumbra) |

TABLE 2

Point light source

| | |
|---|---|
| 0 | Fully occluded (Umbra) |
| 1 | Fully illuminated | the example in FIG. 3A indicates that the point is in penumbra for area light source 100A, fully illuminated for area light source 100B, fully illuminated for point light source 104A, and fully occluded for point light source 104B. Note that the above Tables 1 and 2 are exemplary, and are not intended to be limiting.

FIG. 3B illustrates an exemplary method of storing or caching occlusion information for the points in a scene according to one embodiment. The exemplary scene of FIG. 2 is used by way of example. In embodiments, one or more caches, or buffers, which may be in volatile or non-volatile memory, are allocated for storing the occlusion information for the points in a scene. The buffer(s) may be referred to as an occlusion data structure. In this example, the first six bits of the illustrated buffer correspond to point (0,0), the next six bits correspond to point (0,1), and so on. While this example shows the data for points stored at six-bit boundaries, some embodiments may store point information at byte (8-bit), word (16-bit), or at some other natural boundary for computer systems.

FIG. 3C illustrates an alternative exemplary method of storing or caching occlusion information for the points in a scene according to one embodiment. In this example, the occlusion data, instead of being stored by points in the occlusion data structure, is stored by light sources, with appropriate bits in the buffer portion for each light source corresponding to points in the scene, as illustrated.

In one embodiment, there may be one such memory buffer or one designated portion of a memory buffer as shown in either of the above examples in FIGS. 3B and 3C for each surface in a scene.

FIGS. 4A through 4C illustrate the use of an exemplary occlusion information cache or occlusion data structure in computing direct lighting according to one embodiment. A scene similar to FIG. 1 is used by way of example, with the assumption that there are 10×10 (100) points on a surface 110. FIG. 4A shows an exemplary buffer for caching the occlusion information for an area light source 100 for each of the 100 points on the surface 110. Note that the data value at each point in this example is initially binary 00.

In FIG. 4B, occlusion information for a sparse set of points on surface 110 may be calculated using shadow rays for area light source 100. This occlusion information may be stored in the data structure for each of the sparse set of points, and may indicate if the sample points are fully occluded, fully illuminated, or partially occluded. For example, assuming the binary values in Table 1 indicate the corresponding occlusion/lighting states, point (0,5) is shown to be fully illuminated, point (2,3) is shown to be partially occluded (in penumbra 112), and point (4,5) is shown to be fully occluded (in umbra 114).

In FIG. 4C, polling of points within the neighborhood of point (0,2), or $P_1$, may determine that $P_1$ is fully illuminated by light source 100; therefore, lighting computation may not be performed for $P_1$. Polling of points within the neighborhood of $P_3$ may determine that $P_3$ is fully occluded by intervening object 102; therefore, lighting computation may not be performed for $P_3$. Polling of points within the neighborhoods of $P_2$ and $P_4$, however, may not determine full occlusion or full illumination, and therefore, the points may be assumed to be within (or near) penumbra 112, and thus shadow rays may be used to perform lighting computation for these points.

One embodiment may control the quality of shadow rendering by setting a minimum number N of cache points that are used to decide visibility/occlusion information for other nearby points. In one embodiment, N may be tunable, and thus may be adjusted to adapt for rendering different scenes with different numbers or sizes of light sources and/or complexities of objects in the scene. When N nearby, valid cache points for point lights are found, this embodiment may calculate the intersection of the occlusion bits, and the intersection of the inverse of the occlusion bits. The former gives the set of lights that the cache points agree are lit, and the latter gives the set of lights that the cache points agree are occluded. For area lights, one embodiment may take the intersection of the two bit sets, giving which area lights (or subdomains of area lights) the cache points agree are fully illuminated or fully occluded. This embodiment may then use this information as a replacement for casting shadow rays for those lights that are reasonably sure to be lit or occluded. For those lights for which the cache points do not agree, shadow rays are cast. This approach allows embodiments to cast many fewer shadow rays in umbra and fully illuminated areas of a rendering than conventional techniques, while still rendering sharp shadow boundaries and smooth, accurate penumbra regions.

In one embodiment, the rendering calculation may cycle through a list of all light sources in a scene. For each light source, a check may be performed to determine if nearby cache points agree that the light source is occluded. If this is the case, adding contribution from this light source may be skipped. Next, a check may be performed to determine if nearby cache points agree that a light source is unoccluded. In this case, the unoccluded incoming radiance may be computed for this light source and added to the sum. If the nearby cache points do not agree on whether a point light is occluded, or if they do not agree on full occlusion or full visibility for an area light, shadow-rays may be cast and the direct lighting for this light source may be computed. Since each light source is treated individually and distinctly, high frequency lighting from one light source does not increase the number of shadow rays that need to be cast for other light sources. That is, embodiments may enable the casting of shadow rays only to those light sources for which visibility is changing.

Some embodiments may use an octree data structure for the direct lighting cache; other embodiments may use other data structures. In one embodiment, to ensure that data structure queries of the direct lighting cache are performed efficiently, direct lighting cache points may have two radii of influence. A given radius in a data structure may be queried, but this is slower than querying a single point, as many branches of the data structure (e.g., a tree or octree data structure) are queried as opposed to only a single branch. The two radii of the cache points work to develop an even spacing of cache points, while still allowing 'lazy' cache management, and the ability for a single-point query to find N nearby cache points a majority of the time. The outer radius controls which data structure nodes a given point is added to when it is added to the cache. The inner radius controls the spacing of the points, as each cache hit must contain at least one cache point within this inner radius. If there is no valid cache point within this smaller radius, a new cache point is created. By controlling the ratio of inner radius to outer radius, embodiments may control how many points overlap at a given point in world space.

An acceleration to the N-sample search and bitset intersection process described above that may be implemented in one embodiment is the use of 'accurate' records. In this embodiment, records for points may have an 'accurate' flag that may be set, for example, to true or false. Whenever a new record is added to the cache, the data structure (e.g., an octree data structure) is queried by the outer radius of this cache point. The set of points returned with this query is cycled through and the occlusion information of the new point is compared with these stored points. If the occlusion information of each of these points matches exactly that of the new point, the accurate flag of the new point is set to true. If there is a single neighboring point with a differing occlusion bitset, this accurate flag is set to false, and the accurate flag of each differing stored record is also set to false.

This optimization may serve several purposes. Firstly, it can substantially speed up the data structure queries by allowing embodiments that use accurate records to return from them earlier. If a record is found during a data structure search with an accurate flag set to true, the record is returned and the query ends even if N records have yet to be found. Secondly, it can further reduce the number of shadow rays that must be cast. In some areas of a scene, N cache points may not be found because the placement of cache points is unpredictable as they are created only when needed. These areas may be reduced or eliminated by increasing the outer radii of cache points, but this can increase the number of cache points that have to be searched through at each data structure node. The use of the accurate flag may provide a simpler and faster optimization for filling holes where N cache points cannot be found and for speeding the data structure queries in areas of a constant visibility function.

Figure 5:
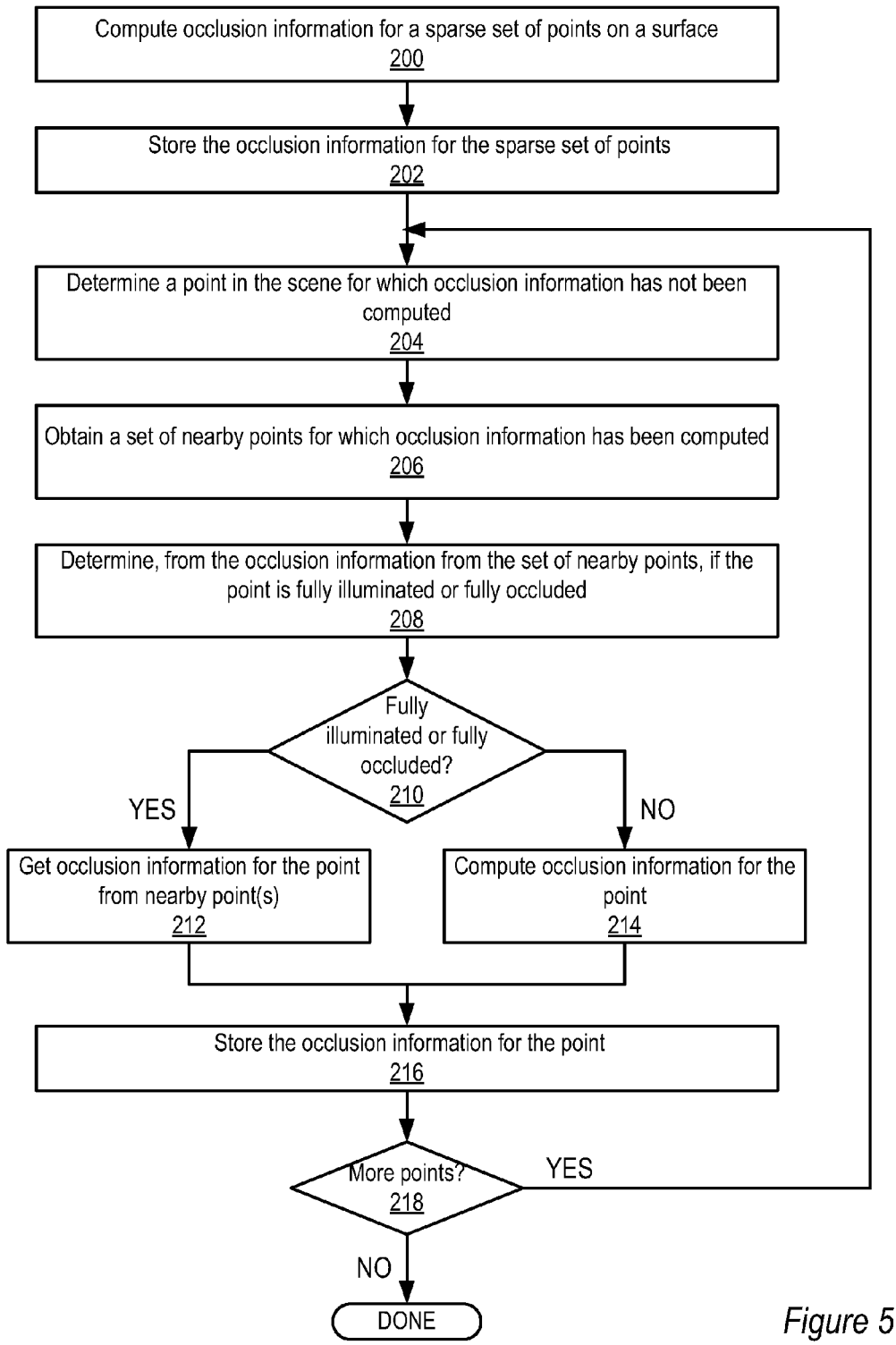
FIG. 5 is a flowchart of a method for computing direct lighting in a scene according to one embodiment.

FIG. 5 is a flowchart of a method for computing direct lighting in a scene according to one embodiment. As indicated at 200, occlusion information for a sparse set of points in a scene may be computed. As indicated at 202, the occlusion information for the sparse set of points may be stored or cached, for example according to the exemplary methods illustrated in FIGS. 3A-3C and FIG. 4B, or alternatively according to some other method, such as in an octree data structured as described above.

As indicated at 204, a point in the scene for which occlusion information has not been computed may be determined. As indicated at 206, a set of nearby points (points in the neighborhood of the current point being considered) for which occlusion information has been computed may be obtained. As indicated at 208, the occlusion information from the set of nearby points may be used to determine if the point is fully illuminated or fully occluded. At 210, if it is determined at 208 that the point is either fully illuminated or fully occluded, then the occlusion information for the point may be determined from one or more of the set of nearby points. At 210, if it is determined at 208 that the point is neither fully illuminated nor fully occluded, then the point may be assumed to be within (or near) penumbra, and therefore occlusion information for the point may be calculated, for example using ray tracing/shadow rays. At 216, the occlusion information for the point may be stored or cached, and thus may be used in determining occlusion information for other points. At 218, if there are more points for which occlusion information needs to be determined, then the method returns to 204 to get a next point. Otherwise, the method has completed for this surface or scene.

Direct Lighting Module Implementation

Figure 6:
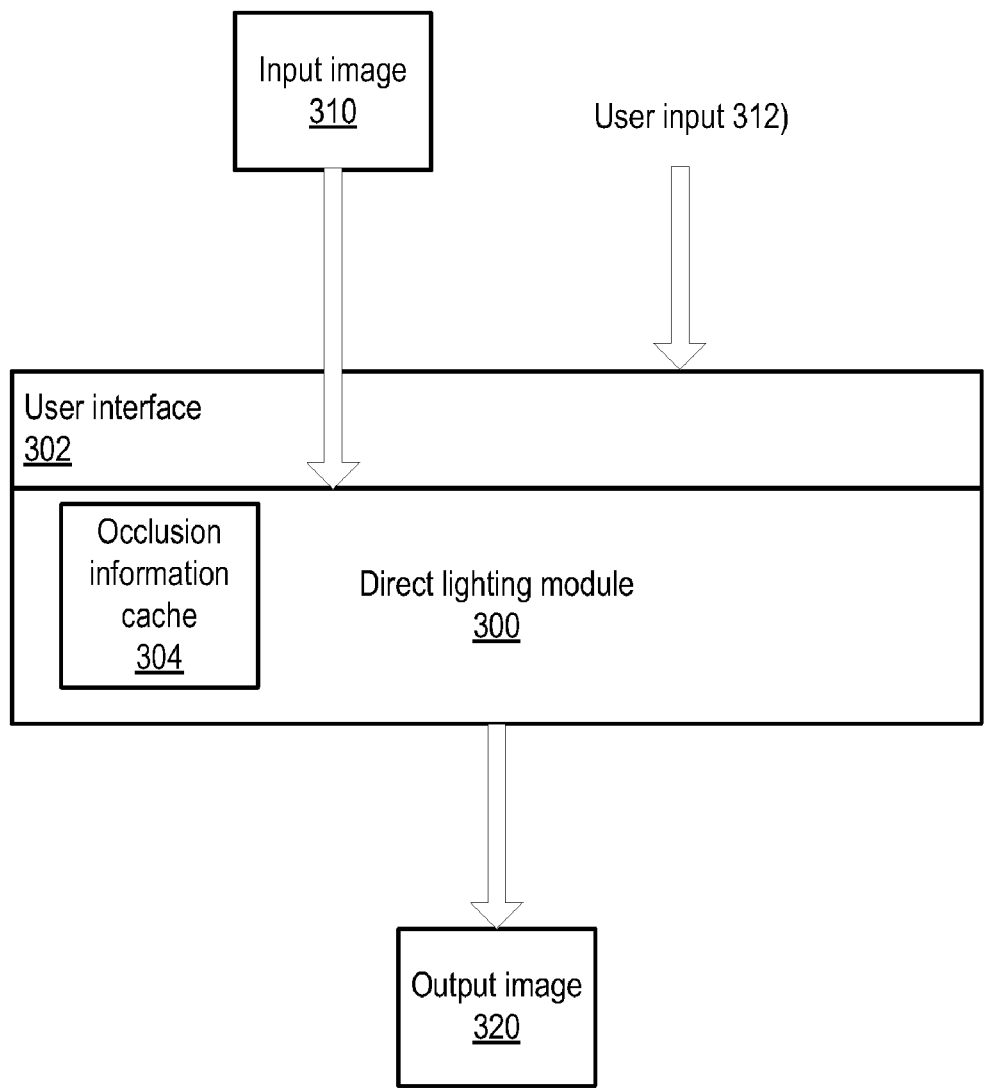
FIG. 6 illustrates an exemplary direct lighting module that may implement embodiments of the method for computing direct lighting in a scene.

FIG. 6 illustrates an exemplary direct lighting module that may implement embodiments of the method for computing direct lighting in a scene described above. Embodiments of the method for computing direct lighting, as described herein, may be implemented as or in a direct lighting module 300 as illustrated in FIG. 6. In one embodiment, module 300 may provide a user interface 302 that includes one or more user interface elements via which a user may initiate, interact with, direct, and/or control the method for computing direct lighting as performed by module 300. Module 300 may obtain an image 310 or region of an image and, optionally, user input 312, and compute direct lighting for the image accordingly as described herein to generate an output image 320 from the input image 310. Occlusion information cache 304 may be used to store determined occlusion information for points on surfaces in the scene, and may be checked for neighborhood points for which occlusion information has been determined to determine if occlusion information for a target point may be obtained from the neighborhood points rather than generated using ray tracing. In one embodiment, output image 320 may be a new image; in other words, input image 310 may be preserved unchanged by module 300. In one embodiment, input image 310 may be directly modified by module 300, and thus output image 320 may represent a modified input image 310.

Direct lighting module 300 may be implemented as or in a stand-alone application or as a module of or plug-in for a graphics application or graphics library that may provide other graphical/digital image processing tools. Examples of types of applications in which embodiments of module 300 may be implemented may include, but are not limited to, scientific, medical, design (e.g., CAD systems), painting, publishing, digital photography, video editing, games, animation, and/or other applications in which digital image processing may be performed. Specific examples of applications in which embodiments may be implemented include, but are not limited to, Adobe® Photoshop® and Adobe® Illustrator®. In addition to generating output image 320, module 300 may be used to display, manipulate, modify, and/or store the output image, for example to a memory medium such as a storage device or storage medium.

Indirect Lighting Computation—Irradiance Cache Spacing

Embodiments may provide a method and apparatus for diffuse indirect lighting computation. An implementation of the method for diffuse indirect lighting (irradiance) computation may be referred to herein as an indirect lighting module. Examples of types of applications in which embodiments of an indirect lighting module may be implemented may include, but are not limited to, scientific, medical, design (e.g., CAD systems), painting, publishing, digital photography, video editing, games, animation, and/or other applications in which digital image generation and/or processing may be performed. Specific examples of applications in which embodiments may be implemented include, but are not limited to, Adobe® Photoshop® and Adobe® Illustrator®.

Embodiments of the indirect lighting module may implement an irradiance caching algorithm that sparsely computes irradiance in the environment and then interpolates irradiance values between these sparsely computed points or extrapolates an irradiance value if only one irradiance cache point is found in a particular query of the cache. This works because irradiance is typically a very low frequency effect. A key to the algorithm is in choosing the location and spacing of these points. Embodiments may provide a method that guides the sample point placement which incorporates cosine weighting to the selection of the sample points.

Figure 7:
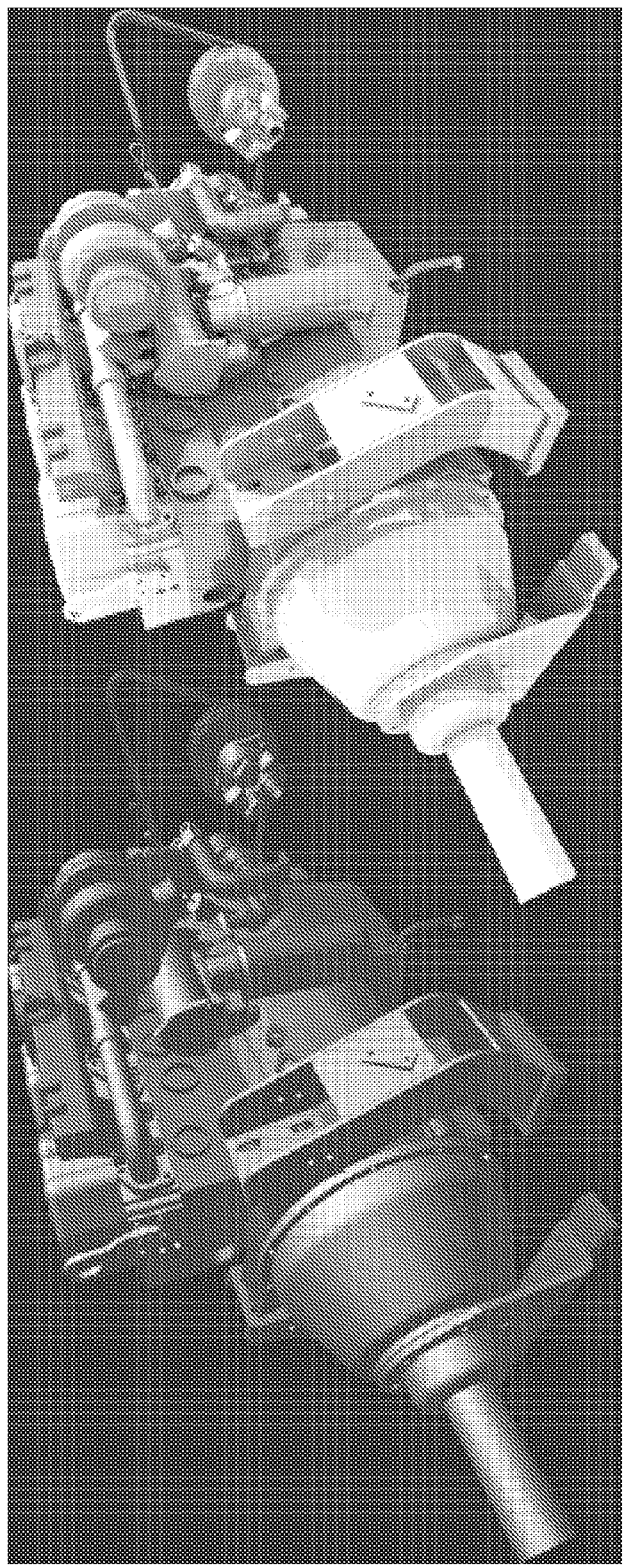
FIG. 7 illustrates ray-traced models without and with global illumination effects.

FIG. 7 illustrates exemplary ray-traced models without and with global illumination effects applied. The image on the left of FIG. 7 was rendered with no global illumination effect. The image on the right of FIG. 7 was rendered using a global illumination effect according to one embodiment. Irradiance caching may be used as an acceleration technique. The result of the global illumination effect using irradiance caching may be approximately the same as ray-tracing-based global illumination; however, performance may be improved using irradiance caching.

The irradiance caching approach used in embodiments of the indirect lighting module differs from previous caching algorithms used in rendering, as the caching approach described herein accelerates the synthesis of a single frame as well as successive frames in much the same manner as the original irradiance cache. Embodiments of the method for diffuse indirect lighting computation may use cosine weighting. Through the application of cosine weighting, if an object detected by a ray is directly overhead, embodiments may assume a significant amount of occlusion or indirect illumination of that surface point, and thus may weight the ray more heavily. If an object is off to the side, and thus at a shallow angle to a normal of the surface point under test, the ray is given less weight. By using cosine weighting, embodiments of the indirect lighting module tend to space out points better around edges and cracks than conventional irradiance caching techniques.

Irradiance is the sum of incoming light (radiance) projected on a surface point. To evaluate this integral in a rendering system, Monte-Carlo integration may be used. The idea is to point sample the integral to achieve an estimate for the sum of incoming light. In practice, this means casting on the order of thousands of rays outward over the hemisphere around each surface point to get a good estimate of the integral. Such computation is very expensive to compute at every visible surface point in a scene.

In many rendering systems, direct irradiance (i.e. light coming from light sources) is handled using a direct monte-carlo technique. Such a technique works well when the light source is small, such as a point light source, since a ray can be cast directly toward the light in evaluating the integral. Indirect irradiance (light that has bounced off of one or more surfaces after leaving the light) in many scenes is typically low frequency, varying smoothly across the scene. Rather than firing thousands of rays around each point to get an estimate of the indirect irradiance, embodiments of the indirect lighting module may use a caching and interpolation/extrapolation scheme.

Conventional irradiance caching techniques typically use minimum distance or average distance value to a nearest hit surface when they evaluate the integral over a hemisphere. However, if a surface is overhead and nearby, it has a greater impact, a larger contribution to the radiance, than a nearby surface that is off at an angle. Therefore, instead of average or minimum distance, embodiments use a cosine weighted distance. In embodiments, indirect irradiance may be computed at a set of sparse locations in the scene, and interpolation and/or extrapolation may be used to reconstruct indirect irradiance between these points. Equation (1) is the form factor:

$$F_{i \to j} = \frac{\cos(\theta_i)\cos(\theta_j)}{\pi r^2} \quad (1)$$

One embodiment may calculate the form factor (1) for each sample when calculating the irradiance value of a new cache point. With the irradiance value and irradiance gradients, one embodiment may also store the maximum form factor calculated during hemisphere sampling. This maximum form factor gives a good approximation of how much a given point's lighting is influenced by nearby geometry. This value may be used, for example, to control the spacing of sample points. Equation (2), given below, shows that the calculation consists of a multiply of this maximum form factor by the squared distance between the stored point and query point summed with one minus the cosine of the angle between the normals of these points. If the error specified by this calculation ($\epsilon_{p_i}$) is below a pre-defined constant $\alpha$, there is a cache hit.

$$\epsilon_{p_i} = ((\vec{p} - \vec{p}_i) \cdot (\vec{p} - \vec{p}_i) + F_{p_{max}} + (1 - \hat{n} \cdot \hat{n}_p) \quad (2)$$

The dot products in equation (2) provide cosine weighting because the dot product between normals gives a cosine weighting. Thus, embodiments scale the confidence factors by the cosine-weighted term. The value ($\epsilon_{p_i}$) is more sensitive to small, nearby surfaces that have a predominant influence on the lighting at a given point than conventional irradiance caching techniques. However, unlike the minimum distance or the average distance used in conventional irradiance caching techniques, this value does not oversample on concave surfaces, and provides improved sample spacing at corners, edges and cracks.

In addition to these benefits, this metric may also speed up the irradiance cache query. The form factor scales directly with the distance squared, which means that when searching for points in an irradiance cache, the squared distance in the error calculation may be used to eliminate many expensive square root calculations for each query.

Figure 8A:
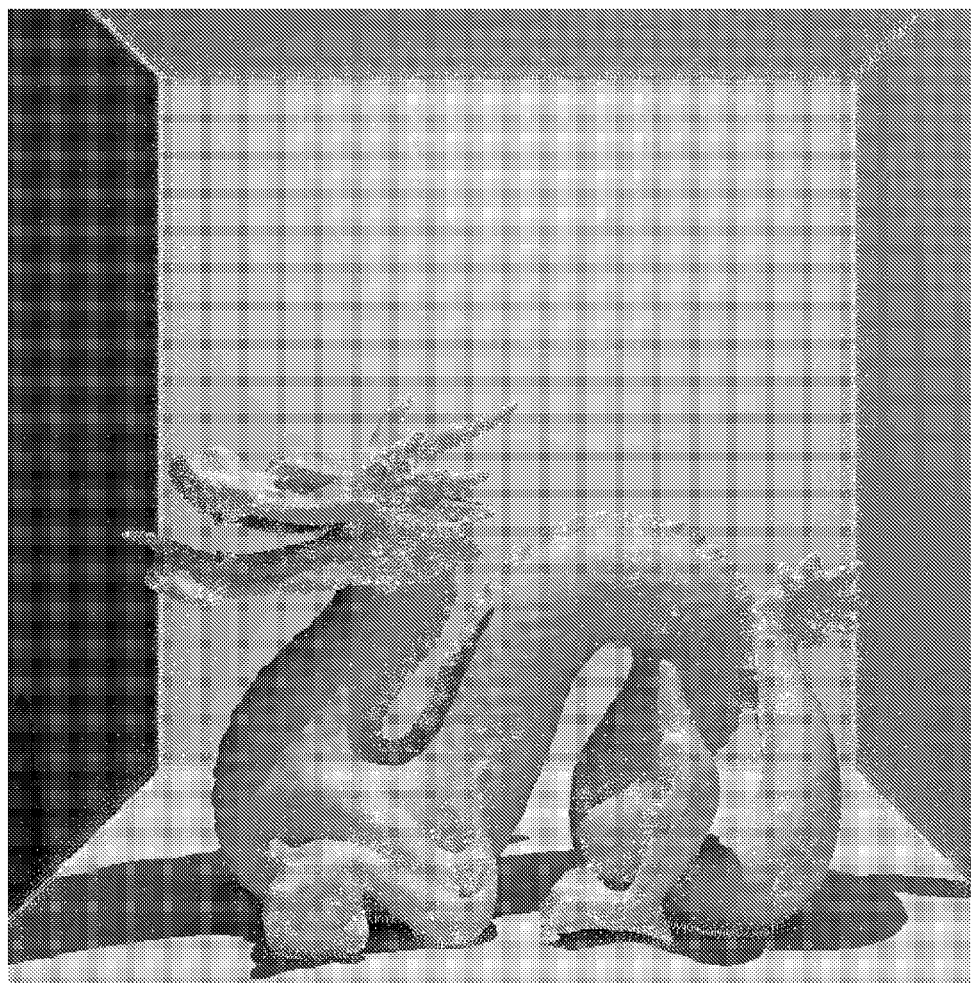
FIGS. 8A-8C illustrate irradiance cache spacing and irradiance points in an exemplary rendered image according to one embodiment.
Figure 8B:
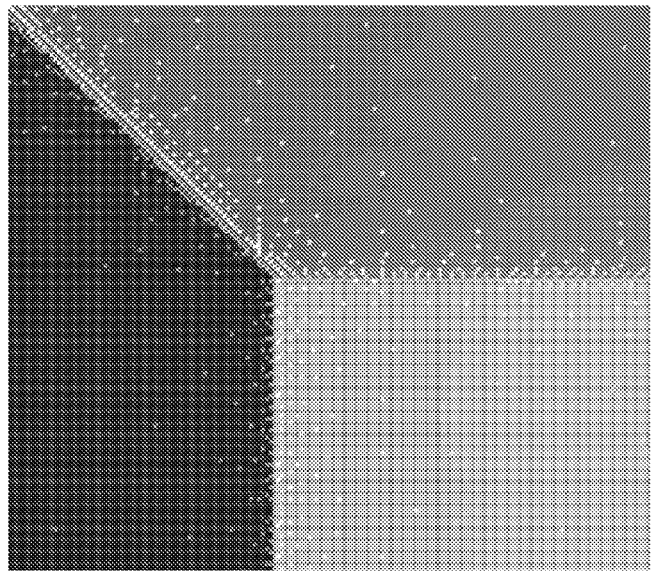
Figure 8C:
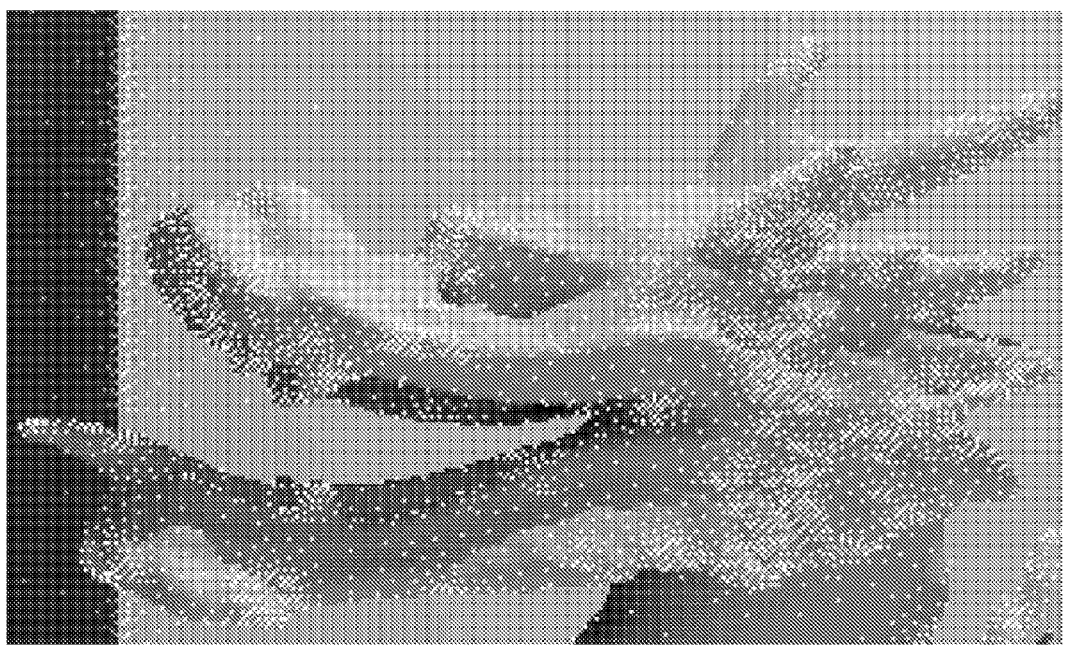

FIGS. 8A-8C illustrate irradiance caching and irradiance points in an exemplary rendered image according to one embodiment. FIG. 8A illustrates a rendered image of a dragon in a room after a first pass. The image shows sample locations (sample points). FIG. 8B is a close-up of the upper left corner of the image in FIG. 8A, showing the sample locations in more detail. FIG. 8C is a close-up of the head of the dragon, also showing the sample locations in more detail. (Source data for the model from which the dragon was rendered was provided by The Stanford University Computer Graphics Laboratory from a publicly available dataset.)

Figure 9:
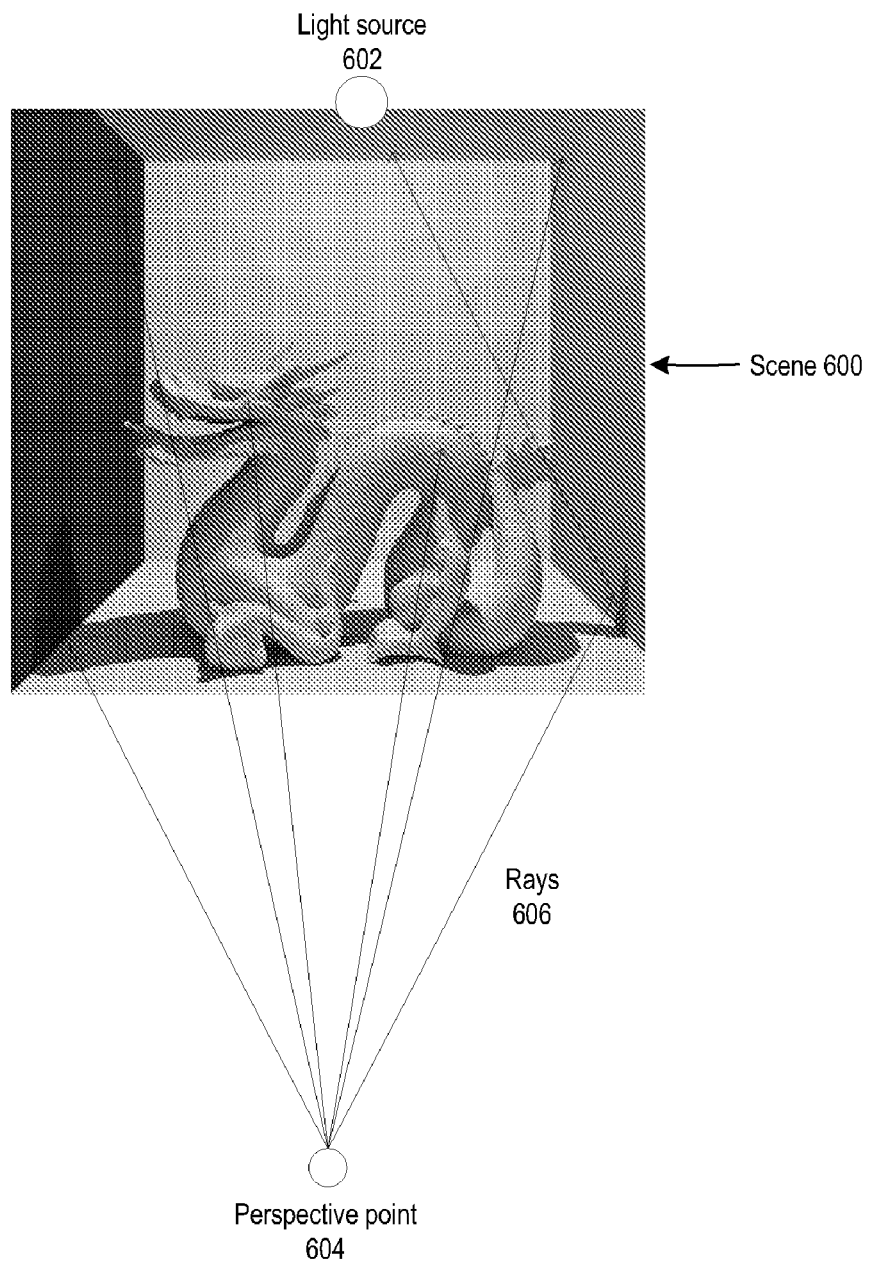
FIG. 9 illustrates the firing of rays at the exemplary rendered image according to one embodiment.

To perform irradiance caching, in one embodiment, rays may be fired, for example starting at the bottom of the scene. FIG. 9 illustrates the firing of rays at an exemplary rendered image according to one embodiment. The rays 606 may be fired from the perspective point 604 of a "viewer" of the scene 600. Light source 602 shows the approximate location of the light source in scene 600. In one embodiment, for each pixel in the scene 600, a ray 606 is fired into the pixel. Note that, since indirect irradiance is being determined, a ray 606 may "bounce" off the point and hit another point in the scene, and so on, until, for example, the ray does not hit a point in the scene, or until some other specified limit is reached. Each time a ray 606 hits a point on a surface in the scene 600, an irradiance data structure, also referred to as an irradiance cache, that caches or stores determined irradiance values for surface points in the scene, may be checked to see if there are nearby irradiance points on the surface. A cosine weighted method as described in relation to equations (1) and (2) may be applied in determining if a point with an irradiance value in the data structure is to be accepted as a nearby irradiance point. If there are enough nearby irradiance points in space whose confidence bounds overlap the point (e.g., at least N nearby irradiance points, where N specifies a minimum threshold for irradiance points needed to perform interpolation), then interpolation using irradiance values from the determined nearby irradiance points may be performed to determine the irradiance value for the point. If there are no or not enough nearby irradiance points, a new irradiance value for that point on the surface is calculated and added to the irradiance cache.

Figure 10:
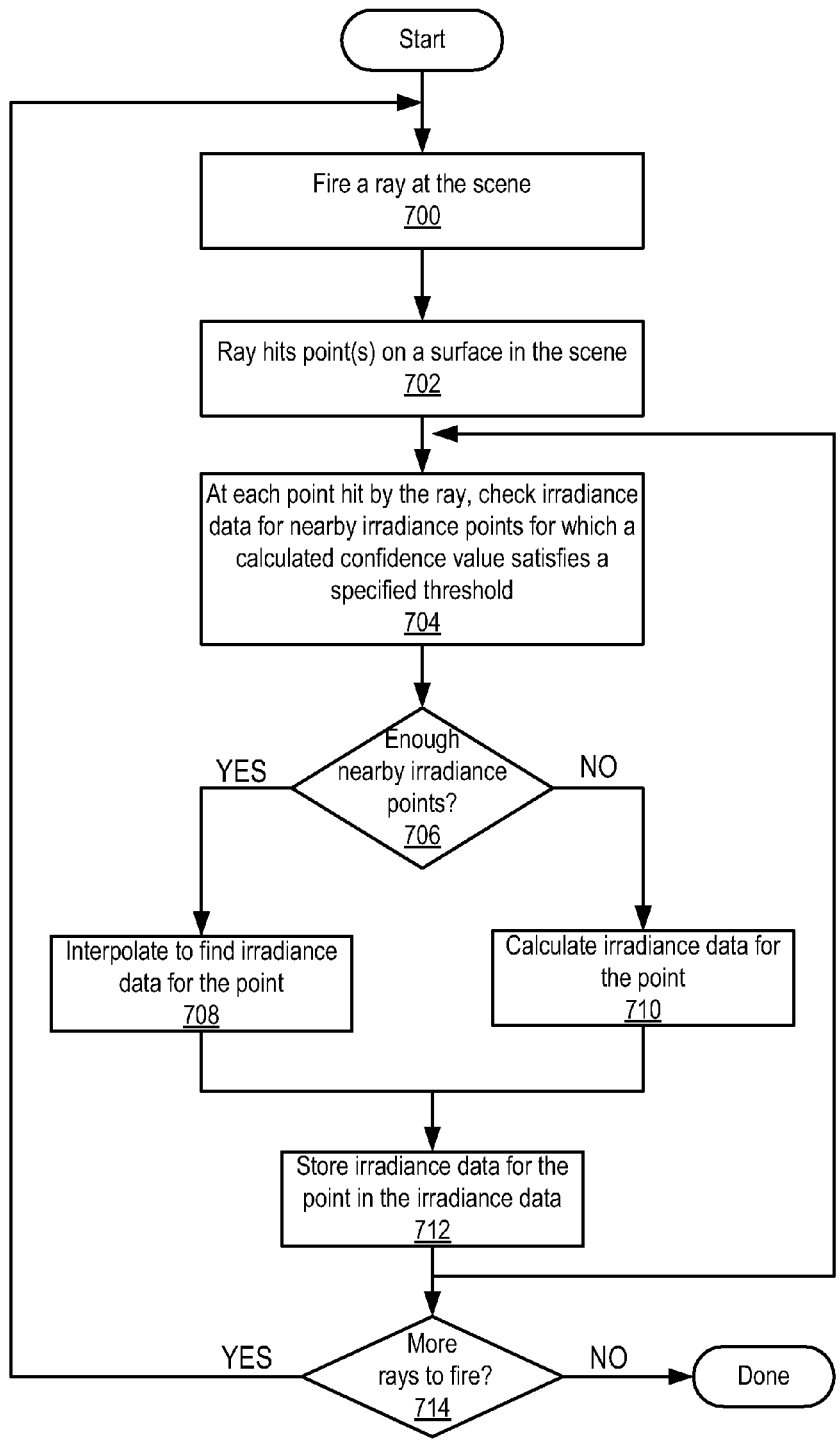
FIG. 10 is a flowchart of a method for diffuse indirect lighting computation in a scene according to one embodiment.

FIG. 10 is a flowchart of a method for diffuse indirect lighting computation in a scene according to one embodiment. This method illustrates a single pass over a scene, e.g. scene 600 of FIG. 9. As indicated at 700, a ray is fired at the scene from a "viewer" perspective. As indicated at 702, the ray hits a point on a surface in the scene. Note that, since irradiance is being determined, the ray may "bounce" off the point and hit another point in the scene, and so on, until the ray does not hit a point in the scene. In some embodiments, the number of "bounces" for a ray may be limited to a set number, or may be limited using a "Russian roulette" technique. Elements 704 through 712 may thus be performed for each point in the scene hit by the ray. As indicated at 704, a check is made to determine if there is irradiance data for nearby irradiance points to the point being evaluated in the irradiance data structure. If there are nearby irradiance points, a confidence value is calculated for each such point. A cosine-weighted method may be used, for example a method that implements equations (1) and (2). If the confidence value calculated for a point for which there is irradiance data in the irradiance data structure satisfies a specified threshold, e.g. as described in relation to equations (1) and (2), then the point is considered a cached nearby irradiance point. As indicated at 706, if enough such nearby irradiance points are found, for example if the quantity of such points is above a specified minimum, then interpolation of the stored irradiance values for at least a portion of the set of located nearby irradiance points may be used to determine the irradiance for the point under evaluation, as indicated at 708. If there are insufficient nearby points in the irradiance data structure, then the irradiance may be calculated for the point, e.g., using a conventional method as indicated at 710. As indicated at 712, the irradiance data for the point may be stored in the irradiance data structure. The irradiance data for the point may thus be used in determining irradiance for other nearby points in the scene. If there are more points hit by the ray, the method returns to 704. Otherwise, as indicated at 714, if there are more rays to fire at the scene on this pass, then the method returns to 700. At 714, if there are no more rays to be fired, the irradiance caching pass is done.

Figure 11:
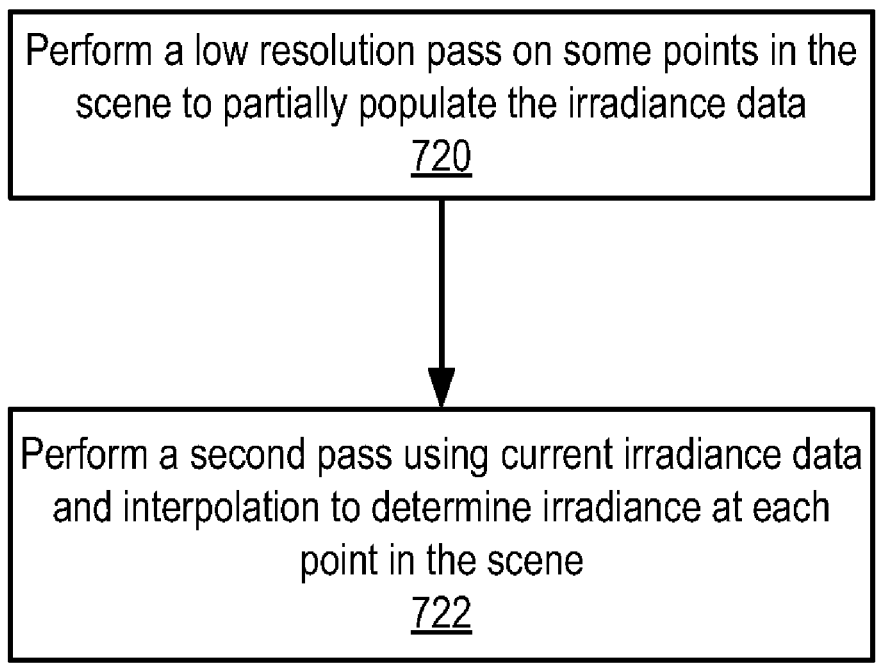
FIG. 11 is a flowchart of a two-pass method for determining irradiance in a scene according to one embodiment.

Irradiance caching may be performed either prior to or during the rendering of a scene. However, when performed while rendering a scene, irradiance caching may create artifacts. Therefore, while in one embodiment irradiance caching may be performed in one pass, in another embodiment, irradiance caching may be performed in multiple, e.g. two, passes. FIG. 11 is a flowchart of a two-pass method for determining irradiance in a scene according to one embodiment. As indicated at 720, a low resolution pass may first be performed on some points in the scene to partially populate the irradiance data. The first pass renders the scene and generates irradiance values at a low resolution. As indicated at 720, a second pass may be performed in which the current irradiance data and an interpolation technique are used to determine irradiance at each point in the scene. The second pass may be performed to render the scene again at higher resolution; on the second pass, the previously filled in irradiance values may be used in determining and interpolating irradiance at points in the scene. In one embodiment, on the second pass, around each point, a blend kernel may be used, for example a disc or circle blend kernel may be used around each point to blend the values and thus to clean up possible artifacts.

Figure 12:
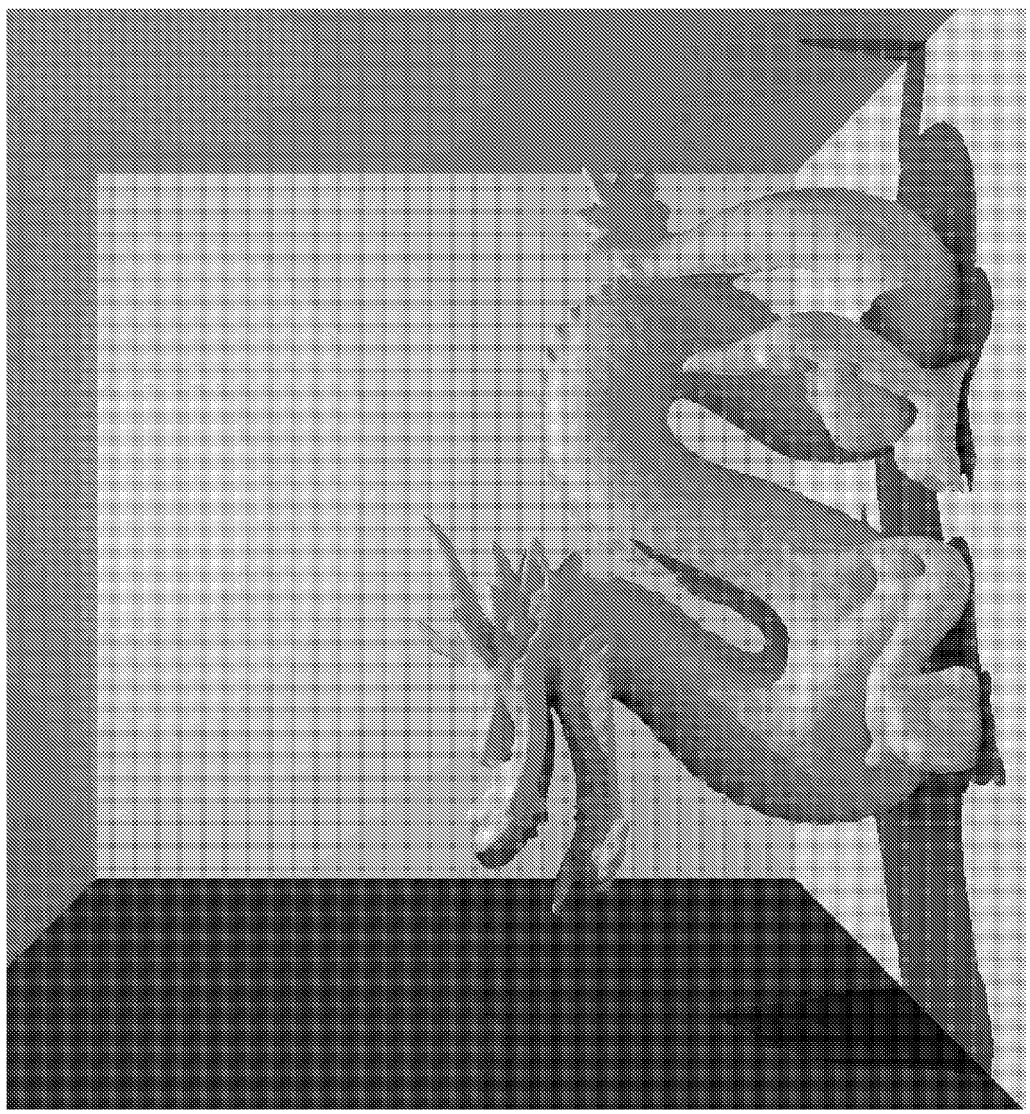
FIG. 12 illustrates the exemplary rendered image of FIG. 8A after a second pass to clean up artifacts left by a first, lower resolution, pass.

Thus, in one embodiment, an initial pass may be made through the image at a lower resolution that fills in some or most of the irradiance cache points. A second pass is then performed, and since some irradiance cache points are already there, interpolation is used to clean up the scene. This may reduce artifacts that may be generated using only a single pass, producing smoother gradients of shading and color. FIG. 12 illustrates the exemplary rendered image of FIG. 8A after a second pass to clean up artifacts left by a first, lower resolution, pass.

In some embodiments a validation pass may be second, where rays are fired towards a light source in regions where the irradiance cache indicates all or no occlusion. Such rays may have random locations or on a regular grid. Rays from such validation points may be used to mark nearby cache points as partially occluded. A third pass then renders the final image.

Indirect Lighting Module Implementation

Figure 13:
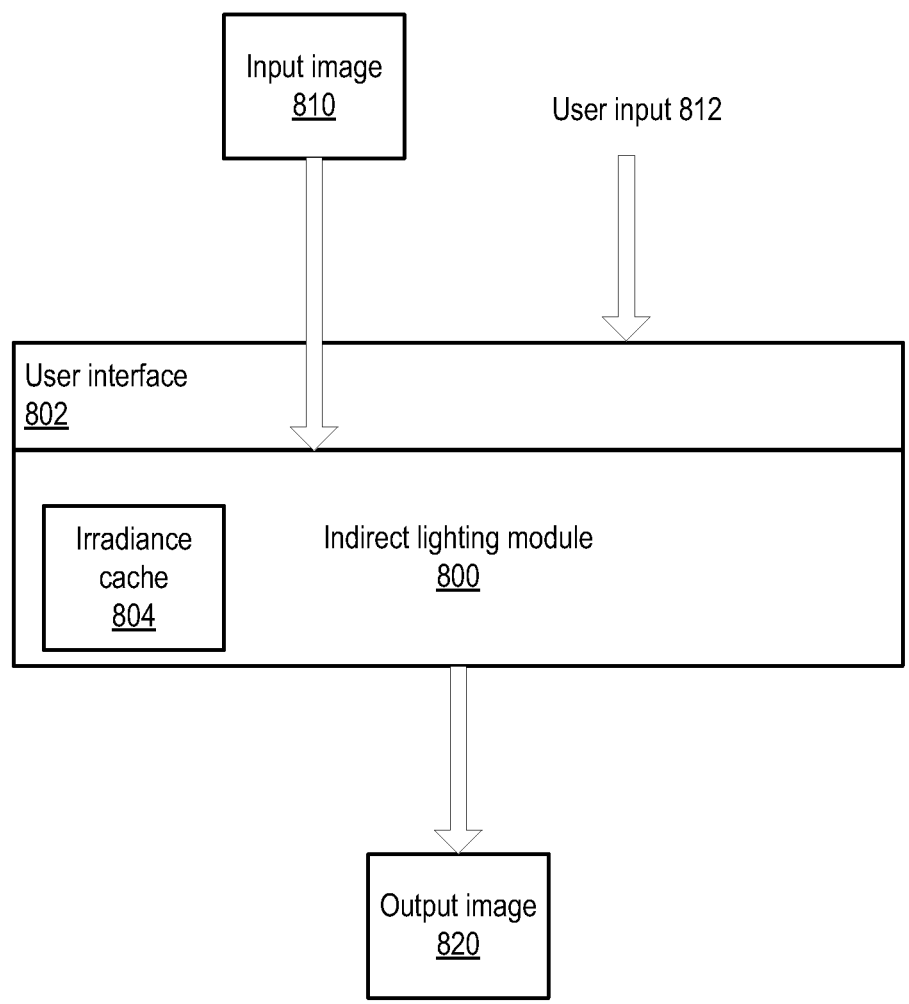
FIG. 13 illustrates an exemplary indirect lighting module that may implement embodiments of the method for diffuse indirect lighting computation in a scene.

FIG. 13 illustrates an exemplary indirect lighting module that may implement embodiments of the method for diffuse indirect lighting computation in a scene described above. Embodiments of the method for diffuse indirect lighting computation, as described herein, may be implemented as or in an indirect lighting module 800 as illustrated in FIG. 13. In one embodiment, module 800 may provide a user interface 802 that includes one or more user interface elements via which a user may initiate, interact with, direct, and/or control the method for diffuse indirect lighting computation as performed by module 800. Module 800 may obtain an image 810 or region of an image and, optionally, user input 812, and compute indirect lighting for the image accordingly as described herein to generate an output image 820 from the input image 810. Irradiance cache 804 may be used to store determined irradiance values and maximum form factors for surface points in the scene, and may be checked for nearby irradiance points when determining if the irradiance value for a current surface point being processed can be generated using interpolation and/or extrapolation, as described herein. A cosine weighted method in accordance with equations (1) and (2) may be used in determining if a cached irradiance point qualifies as a nearby irradiance point. In one embodiment, output image 820 may be a new image; in other words, input image 810 may be preserved unchanged by module 800.

In one embodiment, input image 810 may be directly modified by module 800, and thus output image 820 may represent a modified input image 810.

Indirect lighting module 800 may be implemented as or in a stand-alone application or as a module of or plug-in for a graphics application or graphics library that may provide other graphical/digital image processing tools. Examples of types of applications in which embodiments of module 800 may be implemented may include, but are not limited to, scientific, medical, design (e.g., CAD systems), painting, publishing, digital photography, video editing, games, animation, and/or other applications in which digital image processing may be performed. Specific examples of applications in which embodiments may be implemented include, but are not limited to, Adobe® Photoshop® and Adobe® Illustrator®. In addition to generating output image 820, module 800 may be used to display, manipulate, modify, and/or store the output image, for example to a memory medium such as a storage device or storage medium.

Global Illumination Rendering Module Implementation

Figure 14:
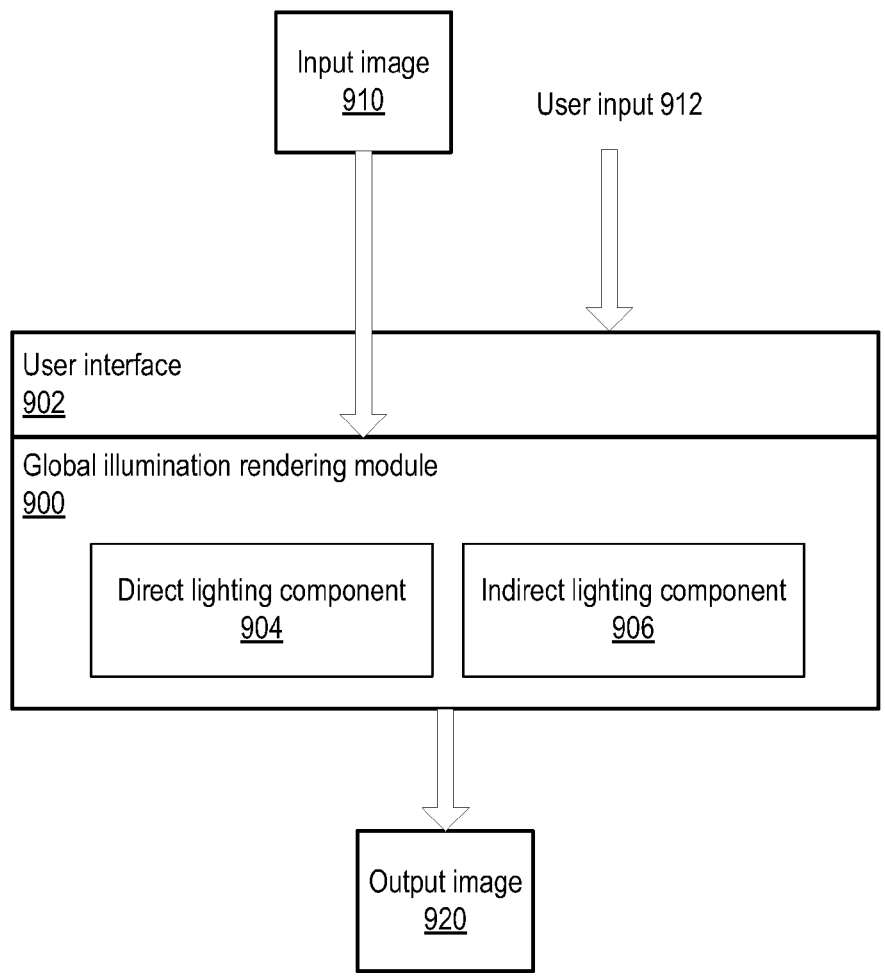
FIG. 14 illustrates an exemplary global illumination rendering module that may implement embodiments of a method for computing direct lighting and a method for diffuse indirect lighting computation.

FIG. 14 illustrates an exemplary global illumination rendering module that may implement embodiments of the method for computing direct lighting and the method for diffuse indirect lighting computation described above. Embodiments of the method for computing direct lighting and the method for diffuse indirect lighting computation, as described herein, may be implemented as or in a global illumination rendering module 900 as direct lighting component 904 and indirect lighting component 906, respectively. In one embodiment, module 900 may provide a user interface 902 that includes one or more user interface elements via which a user may initiate, interact with, direct, and/or control the direct lighting component 904 and/or the indirect lighting component 906. Module 900 may obtain an input image 910 or region of an image and, optionally, user input 912, and compute direct and/or indirect lighting for the image accordingly as described herein to generate an output image 920 from the input image 910. Both direct lighting and indirect lighting may be computed for an input image 910; alternatively, either one or the other may be computed. In one embodiment, direct lighting computation and indirect lighting computation may be performed in parallel. In other embodiments, direct lighting computation and indirect lighting computation may be performed serially; that is, one may be performed first, and then the other. In one embodiment, direct lighting computation may be performed first, and then indirect lighting computation. In another embodiment, indirect lighting computation may be performed first.

In one embodiment, output image 920 may be a new image; in other words, input image 910 may be preserved unchanged by module 900. In one embodiment, input image 910 may be directly modified by module 900, and thus output image 920 may represent a modified input image 910.

Global illumination rendering module 900 may be implemented as or in a stand-alone application or as a module of or plug-in for a graphics application or graphics library that may provide other graphical/digital image processing tools. Examples of types of applications in which embodiments of module 900 may be implemented may include, but are not limited to, scientific, medical, design (e.g., CAD systems), painting, publishing, digital photography, video editing, games, animation, and/or other applications in which digital image processing may be performed. Specific examples of applications in which embodiments may be implemented include, but are not limited to, Adobe® Photoshop® and Adobe® Illustrator®. In addition to generating output image 920, module 900 may be used to display, manipulate, modify, and/or store the output image, for example to a memory medium such as a storage device or storage medium.

Exemplary System

Figure 15:
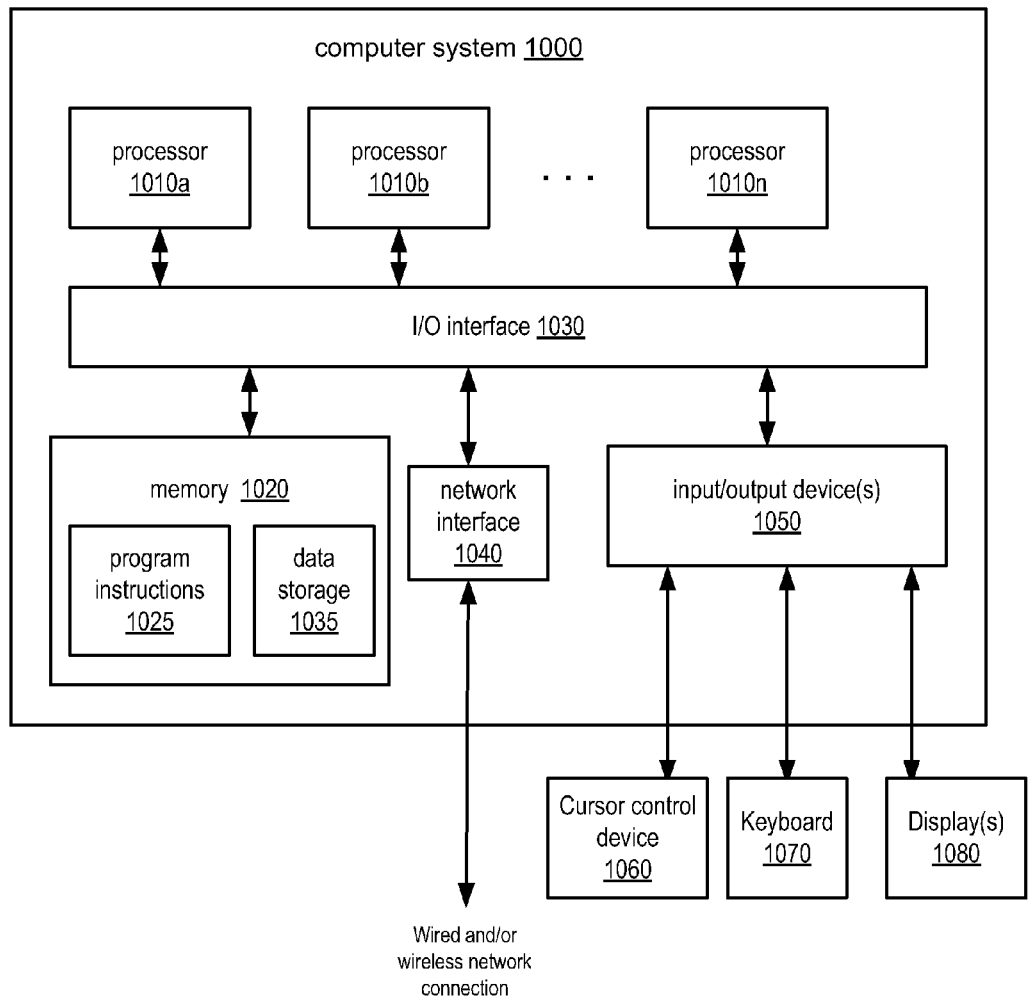
FIG. 15 illustrates an exemplary computer system that may be used in embodiments.

Various components of embodiments of a method and apparatus for global illumination rendering in 3-D computer graphics as described herein, for example a direct lighting module 300 and/or an indirect lighting module 800, or a global illumination rendering module 900 that includes a direct lighting component 904 and indirect lighting component 906, may be executed on one or more computer systems, which may interact with various other devices. One such computer system is illustrated by FIG. 15. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of a method and apparatus for global illumination rendering in 3-D computer graphics, e.g. a direct lighting module 300, an indirect lighting module 800, or a global illumination rendering module 900, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 15, memory 1020 may include program instructions 1025, configured to implement embodiments of a method and apparatus for global illumination rendering in 3-D computer graphics as described herein, e.g. a direct lighting module 300, an indirect lighting module 800, or a global illumination rendering module 900, and data storage 1035, comprising various data accessible by program instructions 1025. In one embodiment, program instructions 1025 may include software elements of embodiments of a method and apparatus for global illumination rendering in 3-D computer graphics, e.g. a direct lighting module 300, an indirect lighting module 800, or a global illumination rendering module 900, as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a method and apparatus for global illumination rendering in 3-D computer graphics as described herein. In particular, the computer system and devices may include any combination of hardware or software that can perform the indicated functions, including computers, network devices, internet appliances, PDAs, wireless phones, pagers, etc.

Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   for each of a subset of points on a surface in a scene:
      calculating direct lighting information and occlusion information for the point, wherein the calculated occlusion information for the point indicates whether the point is fully illuminated, partially illuminated, or fully occluded by an area light source of the scene; and storing the calculated direct lighting information and occlusion information for the point;

for each point on the surface in the scene not in the subset, and for which direct lighting information and occlusion information has not been stored:

determining, from the stored occlusion information for one or more other points, if the point is either fully occluded or fully illuminated by the area light source;

if said determining indicates that the point is either fully occluded or fully illuminated by the area light source, obtaining direct lighting information and occlusion information for the point from the stored direct lighting information and occlusion information;

if said determining indicates that the point is neither fully occluded nor fully illuminated by the area light source, calculating direct lighting information and occlusion information for the point; and storing the direct lighting information and occlusion information for the point; and rendering the scene in accordance with the stored direct lighting information for the points in the scene.

2. The method as recited in claim 1, wherein said calculating direct lighting information and occlusion information for a point that is in the subset comprises determining whether the point is fully illuminated, partially illuminated, or fully occluded by the area light source using ray tracing.

3. The method as recited in claim 1, wherein said calculating direct lighting information and occlusion information for a point that is not in the subset comprises determining whether the point is fully illuminated, partially illuminated, or fully occluded by the area light source using ray tracing.

4. The method as recited in claim 1, wherein the occlusion information for each point in the scene indicates whether the point is fully illuminated, partially illuminated, or fully occluded for each of two or more area light sources of the scene.

5. The method as recited in claim 1, wherein the occlusion information for each point further indicates whether the point is fully illuminated or fully occluded for each of one or more point light sources of the scene.

6. The method as recited in claim 1, wherein the direct lighting information and occlusion information for the points in the scene are stored in an octree data structure.

7. The method as recited in claim 1, wherein said determining, from the stored occlusion information, if the point is either fully occluded or fully illuminated comprises:

determining a set of points in the scene that are within a specified distance of the point and for which direct lighting information and occlusion information has been stored; and polling the occlusion information for the set of points to determine if the point is either fully occluded or fully illuminated by the area light source.

8. The method as recited in claim 1, wherein said obtaining direct lighting information and occlusion information for the point from the stored direct lighting information and occlusion information comprises obtaining the direct lighting information and occlusion information for the point from a set of points in the scene that are within a specified distance of the point.

9. A system, comprising:
at least one processor; and
a memory comprising program instructions, wherein the program instructions are executable by the at least one processor to:

for each of a subset of points on a surface in a scene:

calculate direct lighting information and occlusion information for the point, wherein the calculated occlusion information for the point indicates whether the point is fully illuminated, partially illuminated, or fully occluded by an area light source of the scene;

store the calculated direct lighting information and occlusion information for the point;

for each point on the surface in the scene not in the subset, and for which direct lighting information and occlusion information has not been stored:

determine, from the stored occlusion information for one or more other points, if the point is either fully occluded or fully illuminated by the area light source;

if said determining indicates that the point is either fully occluded or fully illuminated by the area light source, obtain direct lighting information and occlusion information for the point from the stored direct lighting information and occlusion information;

if said determining indicates that the point is neither fully occluded nor fully illuminated by the area light source, calculate direct lighting information and occlusion information for the point; and store the direct lighting information and occlusion information for the point; and render the scene in accordance with the stored direct lighting information for the points in the scene.

10. The system as recited in claim 9, wherein, to calculate direct lighting information and occlusion information for a point that is in the subset, the program instructions are executable by the at least one processor to determine whether the point is fully illuminated, partially illuminated, or fully occluded by the area light source using ray tracing.

11. The system as recited in claim 9, wherein, to calculate direct lighting information and occlusion information for a point that is not in the subset, the program instructions are executable by the at least one processor to determine whether the point is fully illuminated, partially illuminated, or fully occluded by the area light source using ray tracing.

12. The system as recited in claim 9, wherein the occlusion information for each point in the scene indicates whether the point is fully illuminated, partially illuminated, or fully occluded for each of two or more area light sources of the scene.

13. The system as recited in claim 9, wherein the occlusion information for each point further indicates whether the point is fully illuminated or fully occluded for each of one or more point light sources of the scene.

14. The system as recited in claim 9, wherein the direct lighting information and occlusion information for the points in the scene are stored in an octree data structure.

15. The system as recited in claim 9, wherein, to determine, from the stored occlusion information, if the point is either fully occluded or fully illuminated, the program instructions are executable by the at least one processor to:

determine a set of points in the scene that are within a specified distance of the point and for which direct lighting information and occlusion information has been stored; and poll the occlusion information for the set of points to determine if the point is either fully occluded or fully illuminated by the area light source.

16. The system as recited in claim 9, wherein, to obtain direct lighting information and occlusion information for the point from the stored direct lighting information and occlusion information, the program instructions are executable by the at least one processor to obtain the direct lighting information and occlusion information for the point from a set of points in the scene that are within a specified distance of the point.

17. A non-transitory computer-readable storage medium storing program instructions, wherein the program instructions are computer-executable to implement:
    for each of a subset of points on a surface in a scene:
        calculating direct lighting information and occlusion information for the point, wherein the calculated occlusion information for the point indicates whether the point is fully illuminated, partially illuminated, or fully occluded by an area light source of the scene;
        storing the calculated direct lighting information and occlusion information for the point;
    for each point on the surface in the scene not in the subset, and for which direct lighting information and occlusion information has not been stored:
        determining, from the stored occlusion information for one or more other points, if the point is either fully occluded or fully illuminated by the area light source;
        if said determining indicates that the point is either fully occluded or fully illuminated by the area light source, obtaining direct lighting information and occlusion information for the point from the stored direct lighting information and occlusion information;
        if said determining indicates that the point is neither fully occluded nor fully illuminated by the area light source, calculating direct lighting information and occlusion information for the point; and
        storing the direct lighting information and occlusion information for the point; and
    rendering the scene in accordance with the stored direct lighting information for the points in the scene.

18. The non-transitory computer-readable storage medium as recited in claim 17, wherein, in said calculating direct lighting information and occlusion information for a point that is in the subset, the program instructions are computer-executable to implement determining whether the point is fully illuminated, partially illuminated, or fully occluded by the area light source using ray tracing.

19. The non-transitory computer-readable storage medium as recited in claim 17, wherein, in said calculating direct lighting information and occlusion information for a point that is not in the subset, the program instructions are computer-executable to implement determining whether the point is fully illuminated, partially illuminated, or fully occluded by the area light source using ray tracing.

20. The non-transitory computer-readable storage medium as recited in claim 17, wherein the occlusion information for each point in the scene indicates whether the point is fully illuminated, partially illuminated, or fully occluded for each of two or more area light sources of the scene.

21. The non-transitory computer-readable storage medium as recited in claim 17, wherein the occlusion information for each point further indicates whether the point is fully illuminated or fully occluded for each of one or more point light sources of the scene.

22. The non-transitory computer-readable storage medium as recited in claim 17, wherein the direct lighting information and occlusion information for the points in the scene are stored in an octree data structure.

23. The non-transitory computer-readable storage medium as recited in claim 17, wherein, in said determining, from the stored occlusion information, if the point is either fully occluded or fully illuminated, the program instructions are computer-executable to implement:
    determining a set of points in the scene that are within a specified distance of the point and for which direct lighting information and occlusion information has been stored; and
    polling the occlusion information for the set of points to determine if the point is either fully occluded or fully illuminated by the area light source.

24. The non-transitory computer-readable storage medium as recited in claim 17, wherein, in said obtaining direct lighting information and occlusion information for the point from the stored direct lighting information and occlusion information, the program instructions are computer-executable to implement obtaining the direct lighting information and occlusion information for the point from a set of points in the scene that are within a specified distance of the point.

* * * * *